No. 718,268. PATENTED JAN. 13, 1903.
J. T. MEATS.
BEAM LATCH OR DOG FOR LOOMS, &c.
APPLICATION FILED OCT. 23, 1902.
NO MODEL.
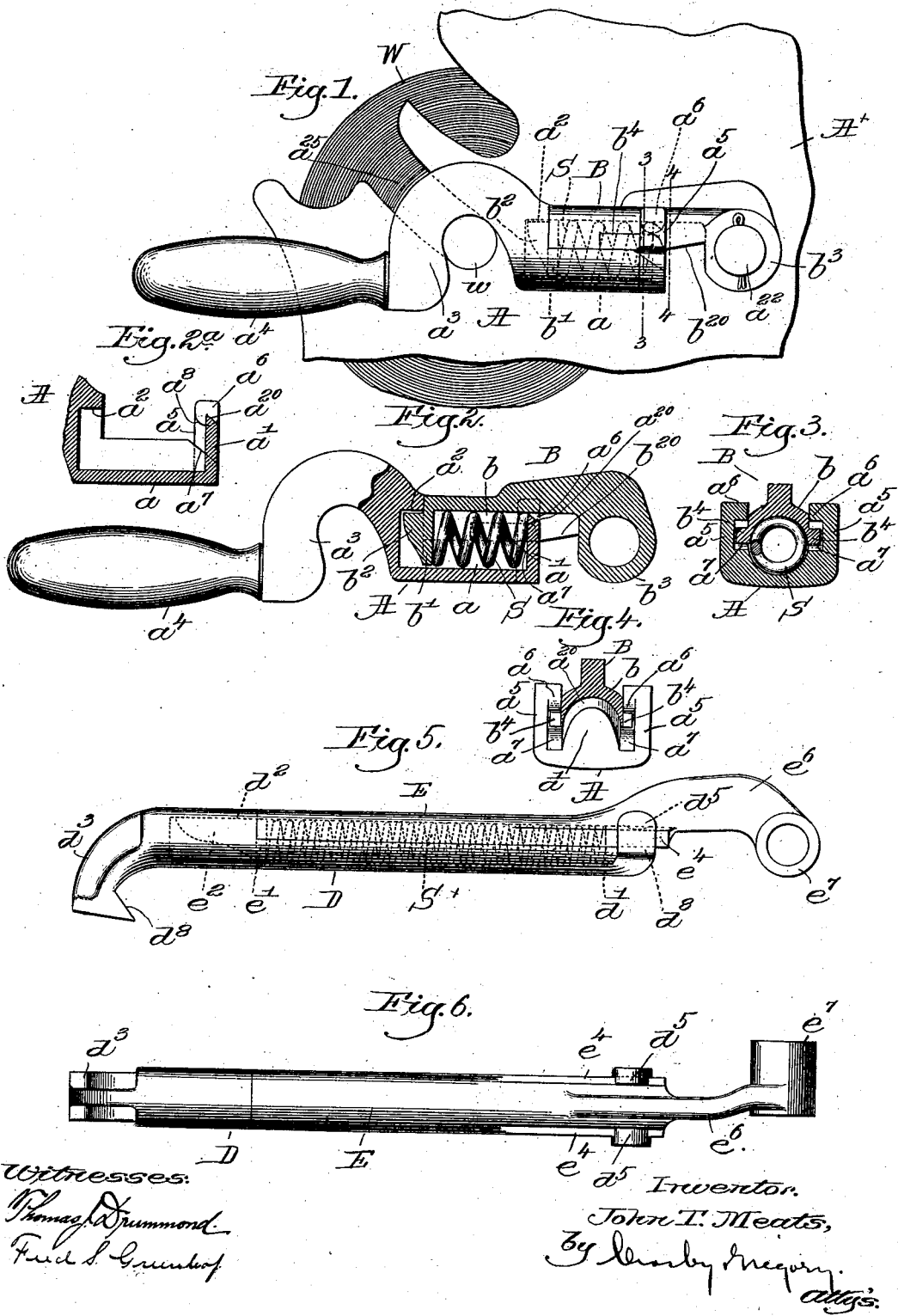
Witnesses:
Thomas Drummond
Fred S. Grunhof
Inventor.
John T. Meats,
By Crosby Gregory
attys.

UNITED STATES PATENT OFFICE.

JOHN T. MEATS, OF TAUNTON, MASSACHUSETTS, ASSIGNOR TO MASON MACHINE WORKS, OF TAUNTON, MASSACHUSETTS, A CORPORATION OF MASSACHUSETTS.

BEAM LATCH OR DOG FOR LOOMS, &c.

SPECIFICATION forming part of Letters Patent No. 718,268, dated January 13, 1903.

Application filed October 23, 1902. Serial No. 128,431. (No model.)

*To all whom it may concern:*

Be it known that I, JOHN T. MEATS, a citizen of the United States, and a resident of Taunton, county of Bristol, State of Massachusetts, have invented an Improvement in Beam Latches or Dogs for Looms, &c., of which the following description, in connection with the accompanying drawings, is a specification, like letters on the drawings representing like parts.

This invention has for its object the production of a novel and effective longitudinally-extensible latch, dog, or hook for use in connection with warp-beams of looms, to hold the journals thereof in their bearings, and with slight modification applicable for other purposes.

In accordance with my invention the latch or dog comprises, essentially, two chambered members relatively movable longitudinally, superposed one upon the other to inclose a spring which resists their extension, and with slidable locking means to prevent lateral separation of the said members. The spring is inclosed completely and concealed by the said members, which latter are substantially semicylindrical in their chambered portions and slide upon each other, one member being provided with a fulcrum-hub in the present instance of my invention and the other member with a latch-hook or similar device.

The various novel features of construction embodied in my invention will be described hereinafter and particularly pointed out in the following claims.

Figure 1 is a side elevation of a latch or dog embodying my invention and illustrated in connection with a portion of a loom to serve as a beam-latch. Fig. 2 is a part-longitudinal section of the latch or dog shown in Fig. 1. Fig. $2^a$ is a similar view of a portion of one of the members of the latch or dog. Fig. 3 is a transverse sectional view on the line 3 3, Fig. 1, looking toward the left. Fig. 4 is a similar view on the line 4 4, Fig. 1. Fig. 5 is a side elevation, and Fig. 6 is a top or plan view, of a modified form of the device to be described.

Referring to Figs. 1 and 2, the latch or dog comprises two superposed members A and B, the former having a semicylindrical or chambered portion $a$, Fig. $2^a$, closed at one end to form an abutment $a'$ and having an overhanging shoulder $a^2$ at the other end of the chambered portion, the top of the abutment being beveled, as at $a^{20}$, Fig. $2^a$. Beyond the shouldered end of the portion $a$ the member A is flattened and shaped to form a latch-hook $a^3$, downturned, as herein shown, and terminating in a suitable handle $a^4$. At its closed end $a'$ the member A is provided on its opposite sides with two upturned lugs $a^5$, Figs. $2^a$, 3, and 4, having inturned heads $a^6$, which overhang the rearwardly beveled or inclined portions $a^7$ at the rear ends of the longitudinal edges of the portion $a$, spaces being left between the inner upright sides of the lugs and the abutment $a'$, the under faces of the heads $a^6$ being convexed, as shown clearly in Fig. $2^a$, at $a^8$. The member B is semicylindrical or chambered at $b$, it having substantially the same radius as the part $a$ of the member A, upon which latter it is superposed, and at one end the member B has a downturned abutment $b'$ with a projecting tongue $b^2$ on its outer face. At its opposite end the said member is enlarged to form a fulcrum-hub $b^3$, and short longitudinal ribs $b^4$ are formed on its sides to pass beneath the heads $a^6$ and between the lugs $a^5$ and the end $a'$ of member A. A strong spiral expanding spring S is inserted in the tubular chamber formed by the superposed parts $a$ and $b$ of the two members, the spring bearing at its opposite ends against the end $a'$ of the one member and the abutment $b'$ of the other member, respectively. Between the ribs $b^4$ and the hub $b^3$ the under face of the member B is beveled, as at $b^{20}$, Figs. 1 and 2, on the lower edges of its depending sides for a purpose to be described.

In assembling the members the part of the member B between the hub and the ribs $b^4$ is dropped down between the lugs $a^5$ and the beveled edges $b^{20}$ are tilted to rest on the inclined edges $a^7$ of the member A and the spring S is inserted between the parts $a$ and $b$. The member B is then drawn rearwardly or toward the right, Fig. 1, its ribs $b^4$ passing beneath the overhanging heads $a^6$, the convexed faces $a^8$ of the latter permitting such movement, and when the tongue $b^2$ can descend past the end of the shoulder $a^2$ the member B is turned down till the longitudinal edges of its portion $b$ rest upon the corresponding edges of the portion $a$ of member A. The spring S, which has been compressed by the previous operation, is permitted to expand, and it immediately causes the members to assume the relative position shown in Figs. 1 and 2.

I prefer to bevel the top of the end $a'$ of the part $a$ in order that the relative tipping movement of the two members in assembling may be facilitated. At such time the coöperation of the tongue and shoulder and the heads of the lugs $a^5$ with the ribs $b^4$ constitutes sliding locking means to prevent accidental lateral separation of the members, while they may be extended by relative longitudinal movement, which is resisted by the spring. The latter is wholly inclosed and protected by the chambered portions, and the end of the shoulder coöperating with the face of the abutment $b'$ above the tongue $b^2$ acts as a stop to limit the spring-induced movement of the members.

In Fig. 1 the hub $b^3$ is shown as mounted on a fulcrum-stud $a^{22}$ on the loom side $A^\times$, the latter having a notched bearing $a^{25}$ for the journal $w$ of the warp-beam W. The latch-hook $a^3$ when turned down fits over the projecting end of the journal and holds it in place. When the latch is swung up on its fulcrum $a^{22}$, the spring S will be compressed sufficiently to permit the hook $a^3$ to snap over and release the journal.

In the modification shown in Figs. 5 and 6 the general features of construction are substantially as hereinbefore described, but the members D and E are longer and are semi-cylindrical for the greater part of their length. The shoulder $d^2$ and the coöperating tongue $e^2$ are made much longer, as are the locking-ribs $e^4$, which coöperate with overhanging heads $d^5$ to permit of greater extensibility of the device, the member D being cut away longitudinally at $d^8$ below the heads $d^5$ to permit the necessary tilting in assembling. Such modification may be used as a hooked jack in a dobby-head, and for this purpose the outer end of the member D has an overhanging hook $d^3$ at its outer end provided with a flat inclined engaging face $d^8$. The opposite end of the member E is flattened at $e^6$ and provided with a transverse hub $e^7$, by which the device is mounted on a fulcrum or connecting stud. The spring $S^\times$ is made correspondingly long and operates between the abutment $e'$ of one member and the closed end $d'$ of the other member. (See dotted lines, Fig. 5.)

The latch or dog herein shown is strong, durable, and simple in construction, and as the spring is wholly inclosed no obstruction is presented to catch or hold surrounding objects.

Having fully described my invention, what I claim as new, and desire to secure by Letters Patent, is—

1. An extensible latch or dog comprising two superposed, chambered members relatively movable longitudinally, an inclosed spring to resist such movement, and slidable locking means to prevent lateral separation of said members.

2. An extensible latch or dog comprising two superposed, longitudinally-chambered members relatively movable in the direction of their length, an inclosed expanding spring to resist such movement, and slidable locking means at or near the ends of the chambered portions of said members, to prevent their lateral separation.

3. An extensible latch or dog comprising two superposed, longitudinally-chambered members relatively movable in the direction of their length, an inclosed expanding spring to resist such movement, a tongue on one member, a coöperating overhanging shoulder on the other member, and external slidable locking means on said members at the opposite end of their chambered portion, to prevent lateral separation thereof.

4. An extensible latch or dog comprising two superposed, longitudinally-chambered members relatively movable in the direction of their length, an inclosed spring to resist such movement, one member having a longitudinal shoulder at one end, and opposite, inturned lugs at the other end, of its chambered portion, the other member having a tongue and external longitudinal ribs, to coöperate respectively with the shoulder and lugs and constitute slidable locking means to prevent lateral separation of the members.

5. An extensible latch or dog comprising two superposed, chambered members relatively movable longitudinally, an inclosed spring to resist such movement, a hook on one end of one member, a lateral fulcrum-hub on the opposite end of the other member, and slidable locking means to prevent lateral separation of said members.

6. An extensible beam-latch comprising two superposed, chambered members relatively movable longitudinally, an inclosed spiral spring to resist such movement, a hub on the end of one member, a fixed fulcrum on which it is mounted, a latch-hook on the opposite end of the other member, and slidable locking means to prevent lateral separation of said members.

7. An extensible beam-latch comprising two superposed, chambered members relatively movable longitudinally, an inclosed spiral spring to resist such movement, means to limit spring-induced movement of the members, a fulcrum-hub on one member, a latch-hook on the opposite end of the other member, and slidably coöperating locking means on said members to prevent their lateral separation while permitting relative longitudinal movement.

In testimony whereof I have signed my name to this specification in the presence of two subscribing witnesses.

JOHN T. MEATS.

Witnesses:
JOHN C. EDWARDS,
EMILY C. HODGES.